(12) United States Patent
Schiller

(10) Patent No.: US 6,456,295 B1
(45) Date of Patent: Sep. 24, 2002

(54) METHOD FOR SIMULATING DIFFUSION ON A RASTER

(75) Inventor: Stephen N. Schiller, Hayward, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/468,713

(22) Filed: Dec. 21, 1999

(51) Int. Cl.$^7$ ................................................. G09G 5/00
(52) U.S. Cl. ....................................... 345/616; 345/660
(58) Field of Search ............................... 345/616, 581, 345/589, 592, 606, 611, 626, 660, 666; 358/1.9, 447; 348/584

(56) References Cited

U.S. PATENT DOCUMENTS

| | | | |
|---|---|---|---|
| 4,872,056 A | * 10/1989 | Hicks et al. | 348/584 |
| 5,063,375 A | * 11/1991 | Lien et al. | 345/616 |
| 5,467,201 A | * 11/1995 | Fan | 358/447 |
| 5,570,461 A | * 10/1996 | Yokomizo | 345/616 |
| 6,069,609 A | * 5/2000 | Ishida et al. | 345/596 |
| 6,175,424 B1 | * 1/2001 | Iino et al. | 358/1.9 |

OTHER PUBLICATIONS

Briggs, *A Multigrid Tutorial*, 1987, Society for Industrial and Applied Mathematics, Philadelphia, PA, pp. 1–50.

* cited by examiner

*Primary Examiner*—Matthew Luu
(74) *Attorney, Agent, or Firm*—Fish & Richardson P.C.

(57) ABSTRACT

Methods and apparatus for simulating diffusion on an input raster. The method includes receiving an input raster for a region, the input raster including one or more objects having fixed parameter values and one or more areas of the region over which the parameter is to be diffused. The method defines a first and second raster that cover the region where the first raster includes parameter values and the second raster includes set values designating locations corresponding to one or more objects. A procedure is applied to the first and second rasters to compute diffusion values of the parameter for one or more areas of the region. The procedure includes reducing the first and second rasters until a predefined end condition is met, and expanding the reduced first and second rasters back to an original size.

23 Claims, 4 Drawing Sheets

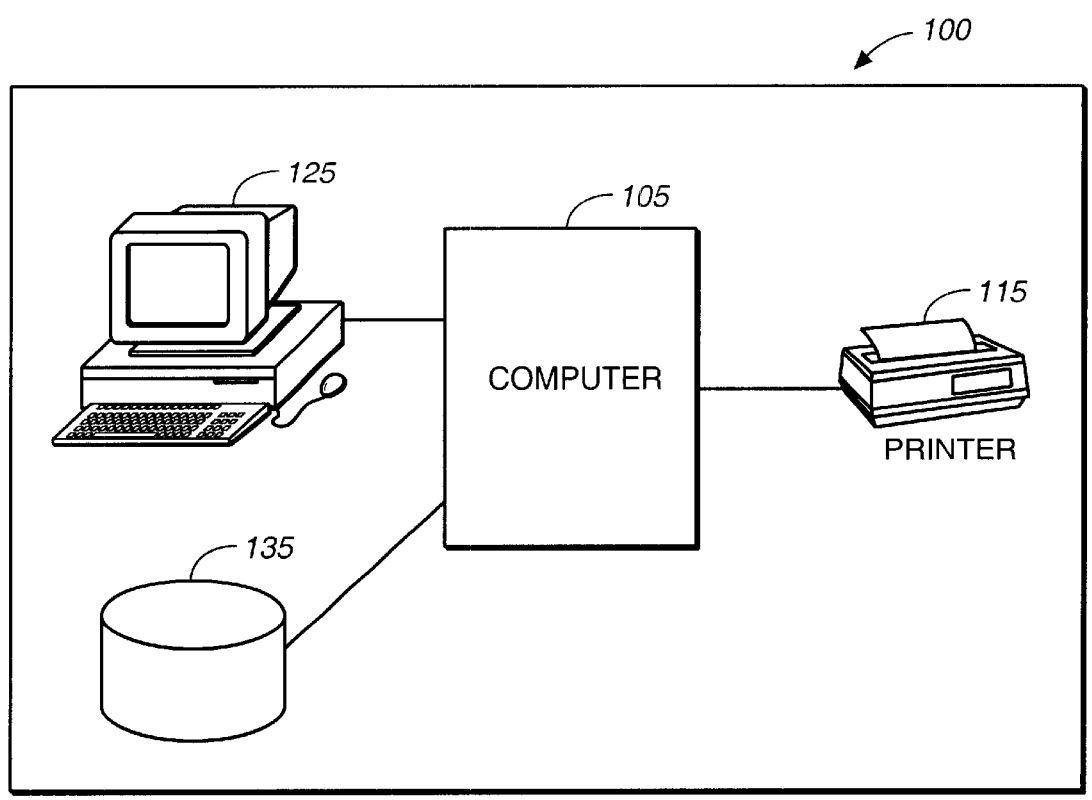
FIG._1

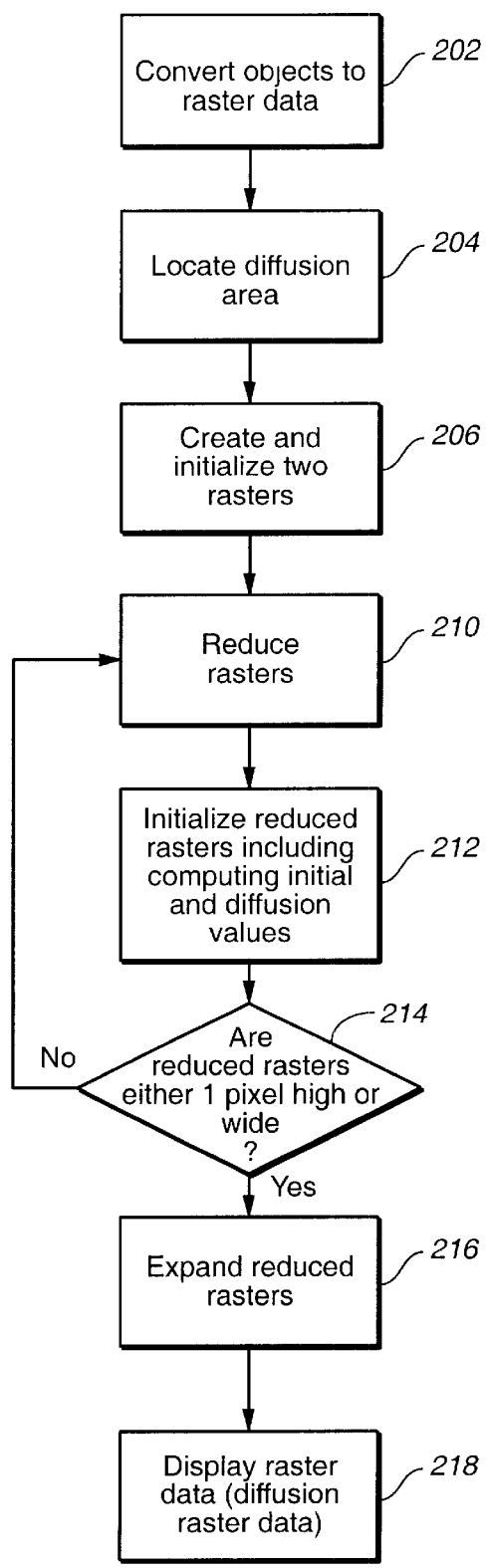
FIG._2

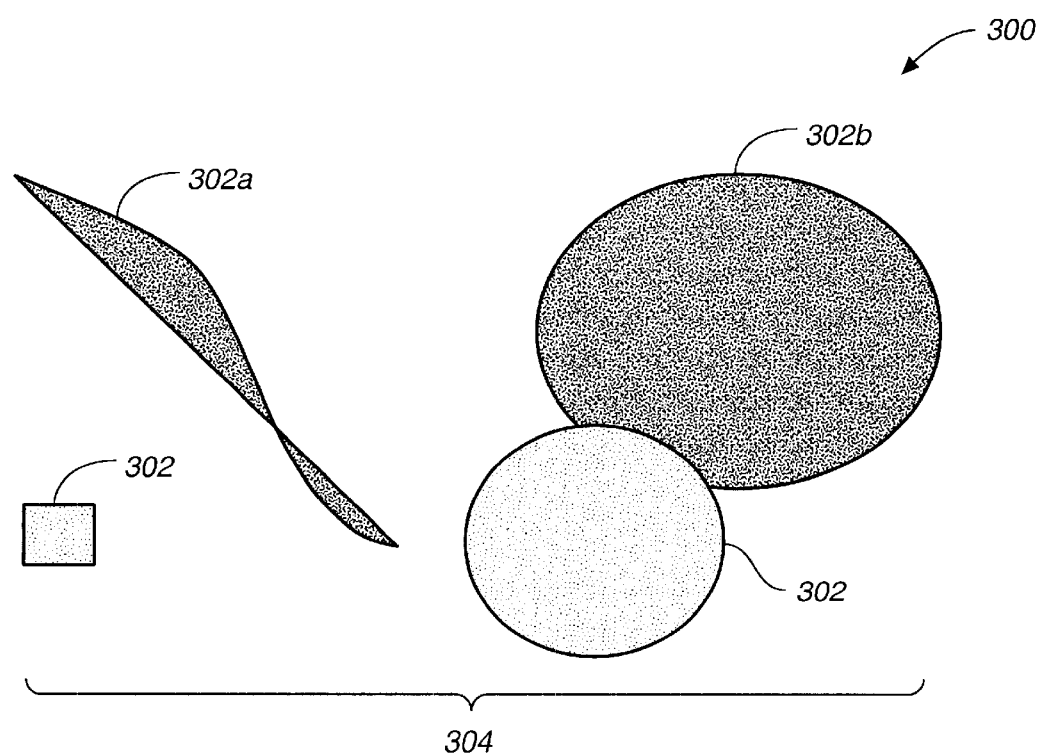
FIG._3

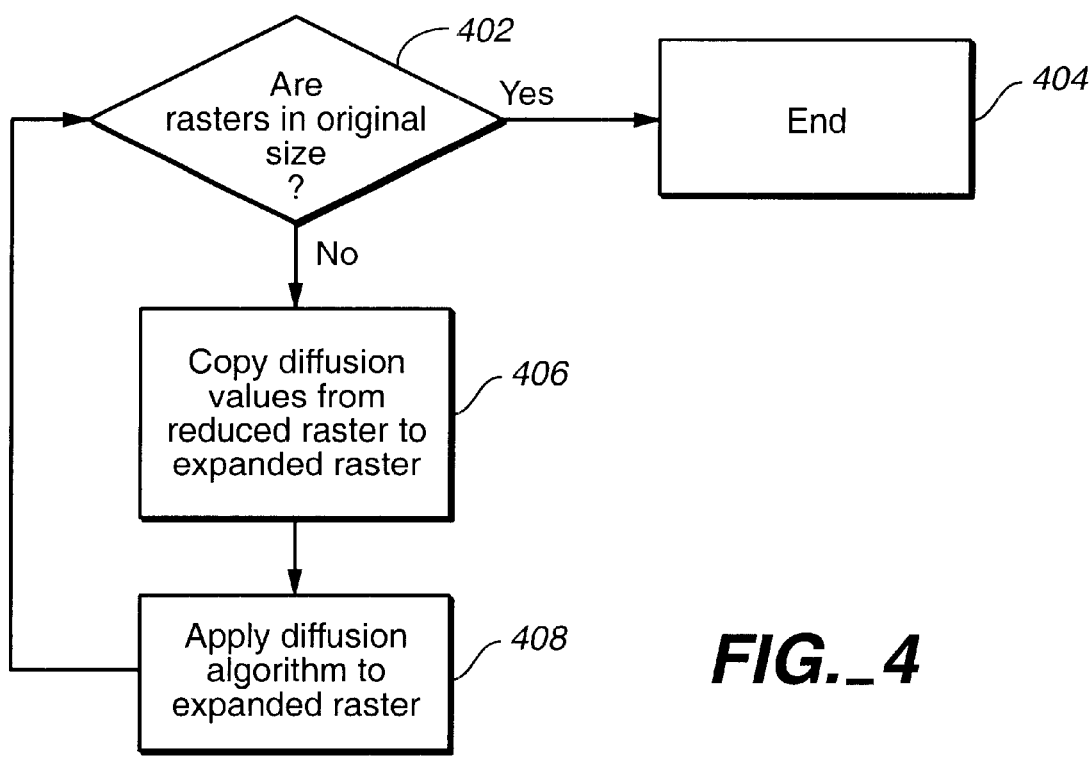
FIG._4

METHOD FOR SIMULATING DIFFUSION ON A RASTER

BACKGROUND

The present invention relates generally to raster graphics processing.

As the availability, affordability, and use of publishing systems increase, techniques for preparing and reproducing pages on a variety of output devices have been developed. Output devices may include image setters, printers, monitors including liquid crystal displays and digital printing presses. A page may include various types of objects such as text, line art, and images, and its appearance is generally described by page description language (PDL) instructions. PDL instructions are generally executed or interpreted by an output device to generate physical output having the desired appearance.

A color page additionally includes information about the colors used in the page. Colors are described in accordance with a "color space," which defines a data representation in terms of basic color components or colorants. The CMYK color space has four colorants (cyan (C), magenta (M), yellow (Y), and key (K) or black) and represents the color to be applied at a particular location on the page as a combination of four values: one representing the amount of cyan; one representing the amount of magenta; one representing the amount of yellow; and one representing the amount of black. In contrast, the CIELAB (Commission Internationale de l'Éclairage) color space has three colorants, representing color as a combination of three values: one which represents luminosity (L); and two (A and B) which, in combination, represent chromaticity. Luminosity refers to the overall brightness of a color. Chromaticity refers to the quality of a color characterized by its dominant and complementary wavelength and purity taken together.

These color data representations are used to create color separations which, in turn, are used by output devices to generate a color output page. Generally, one separation is created for each colorant in the device's color space. For example, the PDL representation of a page to be output by an image setter using the CMYK color space is used to create four color separations, one for each colorant cyan, magenta, yellow, and black. Each separation indicates where on the page the corresponding ink should be applied. The same color data representation, if output on a CRT or LCD using a RGB (red-green-blue) color system, is used to create color separations for red, green, and blue.

Raster images are composed of a predetermined number of picture elements (pixels). The level of detail in a raster image is determined by the number of pixels in the image. Color raster images are defined in terms of a "color space", which is related to real or imaginary color as presented on a display device such as a monitor, liquid crystal display and color printer.

A pixel's color is generally represented by a series of bits (the "color value"), with specific bits indicating a visual output intensity for each sub-pixel used in the color. The specific sub-pixels depend on the color system used. Thus, a 24-bit RGB data representation may allocate bits 0–7 to indicate the amount of blue, bits 8–15 to indicate the amount of green, and bits 16–23 to indicate the amount of red. Such a representation can produce any one of nearly 17 million different pixel colors (i.e., the number of unique combinations of 256 input values of red, green, and blue). By contrast, systems that allocate fewer bits of memory to storing color data can produce only images having a limited number of colors. For example, an 8-bit color image can include only 256 different colors.

In some graphics applications, users blend objects to produce lifelike results. For example, in some conventional drawing applications, diffusion is blending technique used to simulate physically based phenomena. Diffusion, as used in computer graphics, refers to a process for deriving a property value (often color or opacity) for a pixel from surrounding pixels.

SUMMARY

In one aspect the invention provides a method for simulating diffusion on an input raster. The method includes receiving an input raster for a region, the input raster including one or more objects having fixed parameter values and one or more areas of the region over which the parameter is to be diffused. The method defines a first and second raster that cover the region where the first raster includes parameter values and the second raster includes set values designating locations corresponding to one or more objects. Diffusion values are computed for one or more areas of the region. The first and second rasters are reduced until a predefined end condition is met, and then expanded back to an original size.

Aspects of the invention can include one or more of the following advantages. Color or opacity values can be easily diffused on a raster. One or more pixels in a raster can be fixed and a diffusion process can be defined to operate on other pixels in the raster to produce a desirable result. The apparatus can produce color or opacity values for any nonfixed pixels so as to achieve a smoothly changing field of pixels that interpolates the initial values fixed by the user. The computed blend conforms to the shape of the initially fixed values, no matter what their configuration.

These and other advantages will be readily apparent from the Figures and the description below.

BRIEF DESCRIPTION OF THE DRAWINGS

FIG. 1 is a block diagram of a graphical processing system.

FIG. 2 is a flow diagram for a diffusion process in accordance with one aspect of the invention.

FIG. 3 is a representation of a region that is to be processed by a diffusion tool in accordance with the present invention.

FIG. 4 is a flow diagram for a process for expanding rasters.

DETAILED DESCRIPTION

As shown in FIG. 1, illustrative graphical processing system 100 includes computer 105 and one or more raster output devices, 115 through 135. Example output devices include color printer 115, display monitor 125, and storage device 135. Common storage devices include, but are not limited to, magnetic disks (fixed, floppy, and removable), other magnetic media such as tape, optical media such as CD-ROM disks, and magneto-optical devices. Computer 105 can be used to generate a document having one or more pages using a suitable drawing application. The generated document can be represented in a page description language (PDL) and stored or transmitted to a raster output device in the form of PDL file 110. Well known PDLs include POSTSCRIPT and the PORTABLE DOCUMENT FORMAT languages. Other examples of PDLs include the file formats for drawing applications, such as those used in ADOBE ILLUS- TRATOR. ADOBE ILLUSTRATOR and POSTSCRIPT are trademarks of Adobe Systems Incorporated, of San Jose, Calif. The page(s) represented by PDL file 10 can be rendered by an output device to produce raster data which in turn can be displayed by the raster output device.

As described above, a drawing application can be used to produce a document. The drawing application can include one or more tools including a diffusion tool for simulating physical phenomena. The present invention can be implemented in a diffusion tool accessed by a user in a drawing application.

FIG. 2 shows a method 200 implemented by a diffusion tool. Referring also to FIG. 3, the method can be applied to a raster 300 that includes one or more objects 302 ("painted area" of the raster 300) within a defined region 304, where the space between the objects ("unpainted area" of the raster 300) has no defined color. The method can be used create a blend of the objects' (objects 302) edge colors and place that blend within the space between the objects 302, such that the color will transition from a first object 302a to a second object 302b. When there are more than two objects, the additional objects will have color influence on the newly created blend color depending upon object proximity. While the present description is directed to diffusion of color values, the diffusion tool can be used to diffuse any parameter, for example, opacity values.

The process begins by converting the objects to raster if they are not yet raster (202). Then, within the defined canvas space for the region, a diffusion area 306 is located (204). The diffusion area can be where objects 302 are not located, for example when diffusing color values between the edges of two objects. Alternatively, the diffusion area can include one or more regions of fixed values (e.g. fixed color values) and regions having pixels for which a diffusion value needs to be determined. The "empty" raster portion of the diffusion area will be filled with pixels of color based on proximity to nearby objects. In one implementation, diffusion area 306 is defined by drawing an enclosure around it.

Thereafter, the diffusion tool defines and initializes two rasters (first and second rasters) that cover the diffusion area (206). In one implementation, in one raster all pixels are initialized to 0 (the first raster or the diffusion raster), and in the second raster all pixels are initialized to 1 (the fixed object identifier raster). In another implementation, the range of values is from 0 to a predefined large integer (e.g., 256), however, for ease of explanation we will assume the range of pixel values has been normalized to 0 to 1.) Using a rasterizing library (such as Adobe Graphics Manager (AGM)) both rasters are initialized to intensities selected by the user represented by the raster objects (as defined in step 202). That is, values for the objects (e.g., color values or opacity values) are set. Both rasters are initialized in exactly the same way. They will only differ in the unpainted areas; that is, for unpainted pixels, the value for the pixel in each raster will be different (0 and 1, respectively). In one implementation, a bit map is computed that maps out which areas of the rasters include fixed pixels and which are field pixels (or unpainted pixels). Those pixels that have different values in the two rasters are field pixels; those where the values are the same are fixed pixels. The mapping can be used to determine which pixels are to be operated on when calculating diffusion values as will be described in greater detail below. Alternatively, all pixels can be operated on.

A recursive procedure is called to reduce the rasters (210). The recursive procedure computes diffusion values for a raster. If the raster is higher than 1 pixel or wider than 1 pixel, then a raster ½ as wide and ½ as tall as the current raster is computed. Each pixel in this smaller raster corresponds to 4 pixels in the larger raster. In one implementation, if any of the 4 pixels mapping to a single pixel is fixed (correspond to an object) then the single pixel is fixed and has as its value the average of the fixed pixels in the larger raster.

The reduced raster is then passed to a recursive procedure where initial values then diffusion values are computed (212). In an initialization portion of the procedure, the values for a group of pixels in the current raster are averaged and assigned to a corresponding pixel in a reduced raster. Thereafter, an iterative diffusion algorithm is invoked to diffuse the color values for the pixels in the reduced raster. In one implementation, a series of passes are made over the raster, and in each pass the diffusion algorithm is applied to the raster. In one implementation, in each pass, the value of each pixel (a fixed pixel) is replaced (approximately) with the average of its four neighbors (top, bottom, left and right). In one implementation, four passes are required. In another implementation, the value of each pixel is replaced with the average of plural neighboring pixels where the location of the neighboring pixels can be predefined or set by the user. Thereafter, the reduction process is repeated until the raster is reduced to one pixel high or one pixel wide (214).

Next, the reduced raster is recursively expanded into subsequent larger pixel arrays (216). The process for expanding the reduced raster is shown in FIG. 4. The expansion process begins by checking to determine if the rasters are in their original size (402). If so, the process ends (404). If not, the pixel values for the reduced raster are copied into the values for their corresponding pixels in the expanded raster (406). In one implementation, only pixels in the diffusion raster are expanded. In one implementation, each raster computed as part of the reduction process is saved in memory, and subsequently operated on in the expansion process. In each doubling, the value of pixels from a reduced raster are propagated into the expanded pixels. That is, the values of the pixels in the reduced raster are copied into the corresponding pixels in the subsequent larger raster (e.g., the value of a pixel in the reduced raster is copied as the value for the 4 corresponding pixels in the expanded raster). Thereafter, the diffusion algorithm is again invoked to determine diffuse values for the expanded raster (408). The process repeats, until the entire raster is re-expanded to its original size (the process continues at step 402).

Returning to FIG. 2, after the raster has been expanded, the raster can be displayed (218) or stored as desired by the user.

In an alternative implementation, the diffusion tool can be used to blend one or more graphics objects. The graphic objects to be blended are selected by the user of the application and the blend (diffusion) operation is invoked. Thereafter, the blend (diffusion) tool creates two rasters that cover all of the objects to be blended. The objects are rasterized into a first raster that is a fixed resolution version of the graphic objects. A second raster is initialized to 0 and the pixels in the second raster corresponding to those pixels painted in the first raster are set to 1. Thus, the second raster is a map of those pixels that were painted in the first raster. A diffusion algorithm is run on the unpainted pixels of the first raster. Painted versus unpainted pixels can be determined by consulting the second raster.

The diffusion process is a recursive process. The inputs to the algorithm are the two rasters (referred to herein as the paint raster and the fixed map raster). The end condition for the recursion is defined as when the two rasters (which are the same size) are either one pixel wide or one pixel tall. The general recursion step includes making half-size copies of the two rasters. The half-size versions are half as big and half as tall. A recursive procedure is called to compute diffusion values for the unpainted pixels of the half-size paint raster, using the half-size fixed map raster.

The half-size rasters are passed to the recursive procedure, and diffusion values are calculated for the half-size rasters. In one implementation, the values for the half-size rasters are computed as follows: for the paint raster, the pixel in the half-size raster is the average of the four corresponding pixels in the larger raster; for the fixed map raster, the value of the pixel in the half-size raster is 1 if any of the corresponding pixels in the larger raster is 1. Note, that the each "full" size raster is maintained and used in the expansion process described below. Note, that the terms 'half-size' and 'full-size' are relative terms in that there will be any number of instances of the two rasters at some point.

After a value has been calculated for the half-size raster, a recursive procedure is applied to the half-size raster to compute a diffusion value for each field pixel. The diffusion process can be run in numerous passes, in an ordering from a first pixel to a last pixel in the raster, and then according to a different ordering in a next pass. In one implementation, the pixels are operated on in reverse order between successive passes.

The rasters are reduced until the raster is one pixel wide or high. Then an expansion procedure is invoked. More specifically, the values from the half-size paint raster are used to initialize the four corresponding pixels in the current (expanded) paint raster. Each pixel in the half-size raster corresponds to a group of 4 pixels in the raster it was derived from. This is a simple consequence of the half-size rasters being half as tall and half as wide as the rasters they are derived from. In general, as an example, a pixel in a half-size raster with coordinates (i, j) corresponds to pixels in the larger rasters with coordinates (2i, 2j), (2i+1, 2j), (2i, 2j+1), (2i+1, 2j+1). After running the recursive diffusion algorithm on an expanded raster, the process repeats until the raster has been expanded to its original size. In the end, the paint raster contains the blend of the input objects and can be displayed.

The invention has been described in terms of specific examples which are illustrative only and are not to be construed as limiting. The invention may be implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output. Suitable processors include, by way of example, both general and special purpose microprocessors. Other embodiments are within the scope of the following claims.

The diffusion process may be performed repeatedly, as a means for diffusing a parameter. For example, in a first iteration, the diffusion process can be used to determine which pixels in a diffusion area to diffuse (e.g., decide which pixels in the diffusion area are to be operated on rather than based on the location of objects, producing a diffusion mask). The resultant diffuse location raster can be used in diffusing color values when applying a second pass of the diffusion process.

In one implementation, in the iterative diffusion algorithm, in the step where a pixel is replaced with the average of its four neighbors, a constant value, called a bias, can be either added or subtracted from the resulting value stored in each pixel This causes the diffused values to fade to either 0 or 1 over a certain distance. This variation can be applied when the user desires to create a raster that has a fixed value on the edge of an object (such as 1) and fades to other extreme at the interior of the object (such as 0). Note, in this case, the objects color can be ignored, the process diffuses on the painted areas, not the unpainted areas. In another implementation, the bias value, instead of being constant, is taken from a corresponding pixel in raster, call it bias raster, of the same size as the other rasters. The bias raster is reduced as with the other rasters. The value stored in a reduced bias raster is the sum of the corresponding four pixels in the current bias raster (not the average).

The present invention has been described in terms of specific embodiments, which are illustrative of the invention and not to be construed as limiting. The invention can be implemented in hardware, firmware or software, or in a combination of them. Other embodiments are within the scope of the following claims.

What is claimed:

1. A method for simulating diffusion on an input raster, comprising:

receiving an input raster for a region, the input raster including one or more objects having fixed parameter values and one or more areas of the region over which the parameter is to be diffused;

defining a first and second raster that cover the region, the first raster including parameter values and the second raster including set values designating locations corresponding to the one or more objects; and applying a procedure to the first and second raster to compute diffusion values of the parameter for the one or more areas of the region including reducing the first and second rasters, whereby smaller sized first and second rasters are created, until a predefined end condition is met, and expanding the reduced first and second rasters back to an original size.

2. The method of claim 1, wherein the parameter is color.

3. The method of claim 1, wherein the parameter is opacity.

4. The method of claim 1, wherein the parameter is translucence.

5. The method of claim 1, wherein the parameter is transparency.

6. The method of claim 1, wherein the step of reducing the first and second rasters includes:

mapping a plurality of pixels in the first raster to a single pixel in a reduced first raster including determining a parameter value for the single pixel in the reduced first raster as mathematical function of parameter values of the corresponding plurality of pixels in the first raster; and mapping a plurality of pixels in the second raster to a single pixel in a reduced second raster including setting a value for the single pixel in the reduced second raster in accordance with a logical function based on the values of the corresponding plurality of pixels in the second raster.

7. The method of claim 6, wherein the mathematical function is a mathematical average.

8. The method of claim 6, wherein the logical function is a logical AND function.

9. The method of claim 6, wherein the end condition is met when a reduced raster is less than two pixels deep in a dimension.

10. The method of claim 1, wherein the step of expanding the reduced first and second rasters includes:

mapping a pixel in a reduced first raster to a plurality of pixels in a expanded first raster including setting a parameter value for the plurality of pixels in the expanded first raster as a value of the corresponding single pixel in the reduced first raster; and applying an iterative diffusion algorithm to the expanded first raster.

11. The method of claim 10, wherein, for each pixel in a raster, the iterative diffusion algorithm:

identifies one or more neighboring pixels each having a value; and sets a value of a target pixel to be an average of the values of the identified neighboring pixels.

12. The method of claim 11, wherein the neighboring pixels are adjacent pixels.

13. The method of claim 12, wherein the neighboring pixels are pixels in the reduced raster located directly above, below, left and right of the target pixel.

14. The method of claim 11, wherein the iterative diffusion algorithm is applied to pixels in a raster in an order at each iteration.

15. The method of claim 14, wherein the order is different at each iteration.

16. The method of claim 1, further comprising:

after reducing the first and second rasters, applying an iterative diffusion algorithm to the reduced first and second rasters.

17. The method of claim 16, wherein the iterative diffusion algorithm is applied four times.

18. The method of claim 16, wherein, for each pixel in a raster, the iterative diffusion algorithm:

identifies one or more neighboring pixels each having a value; and sets a value of a target pixel to be an average of the values of the identified neighboring pixels.

19. The method of claim 18, wherein the neighboring pixels are adjacent pixels.

20. The method of claim 18, wherein the neighboring pixels are pixels in the reduced raster located directly above, below, left and right of the target pixel.

21. The method of claim 16, wherein the iterative diffusion algorithm is applied to pixels in a raster in an order at each iteration.

22. The method of claim 21, wherein the order is different at each iteration.

23. The method of claim 1, further comprising defining a diffusion mask including defining a third raster to be used in defining which pixels in the second raster are to be diffused when operating on the first and second rasters.

* * * * *